May 10, 1927.

J. P. SEAHOLM 1,628,435

SEAT GUIDE CULTIVATOR

Filed May 22, 1924     5 Sheets-Sheet 1

Inventor:
John P. Seaholm
by L. C. Shonts   Atty.

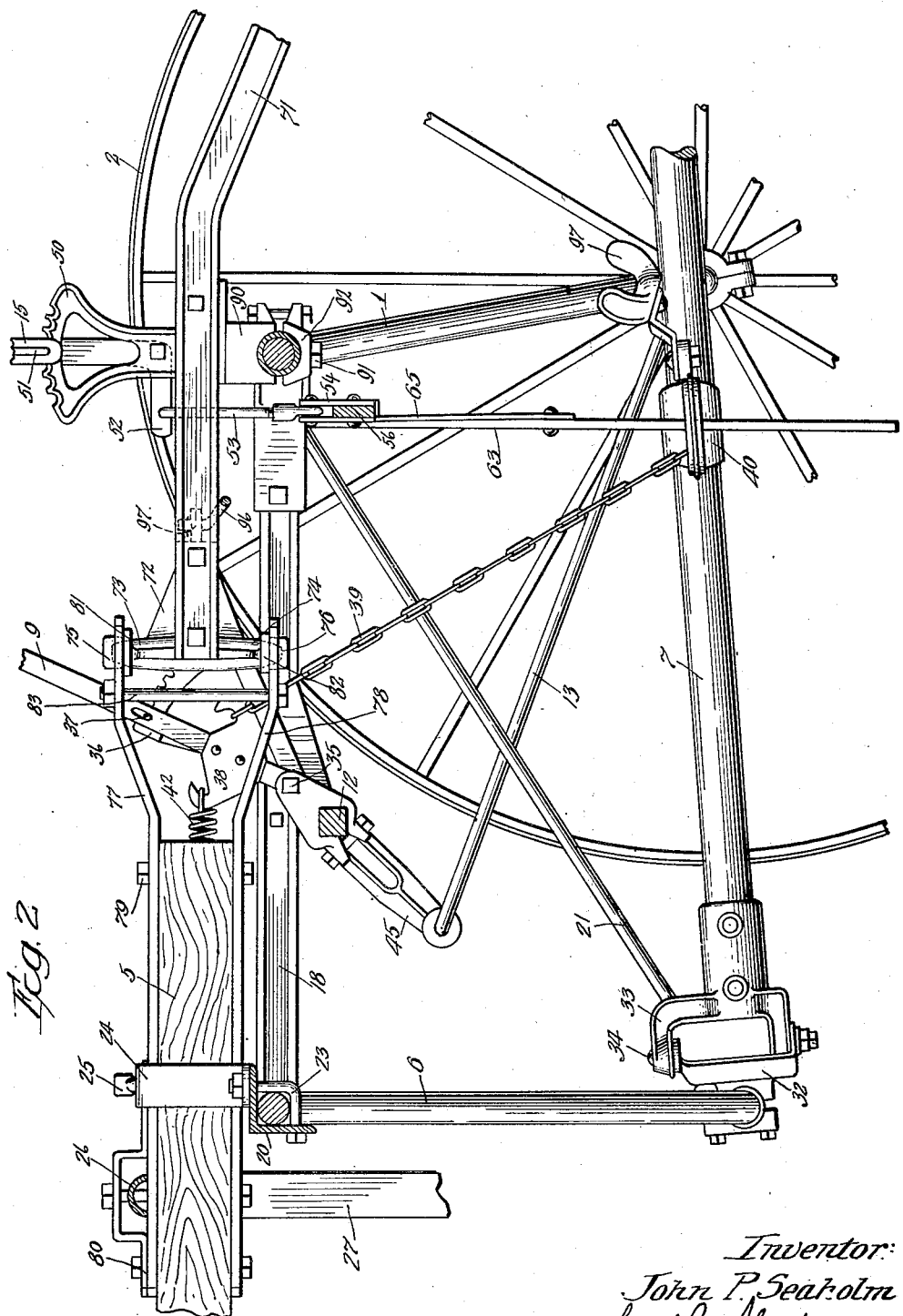

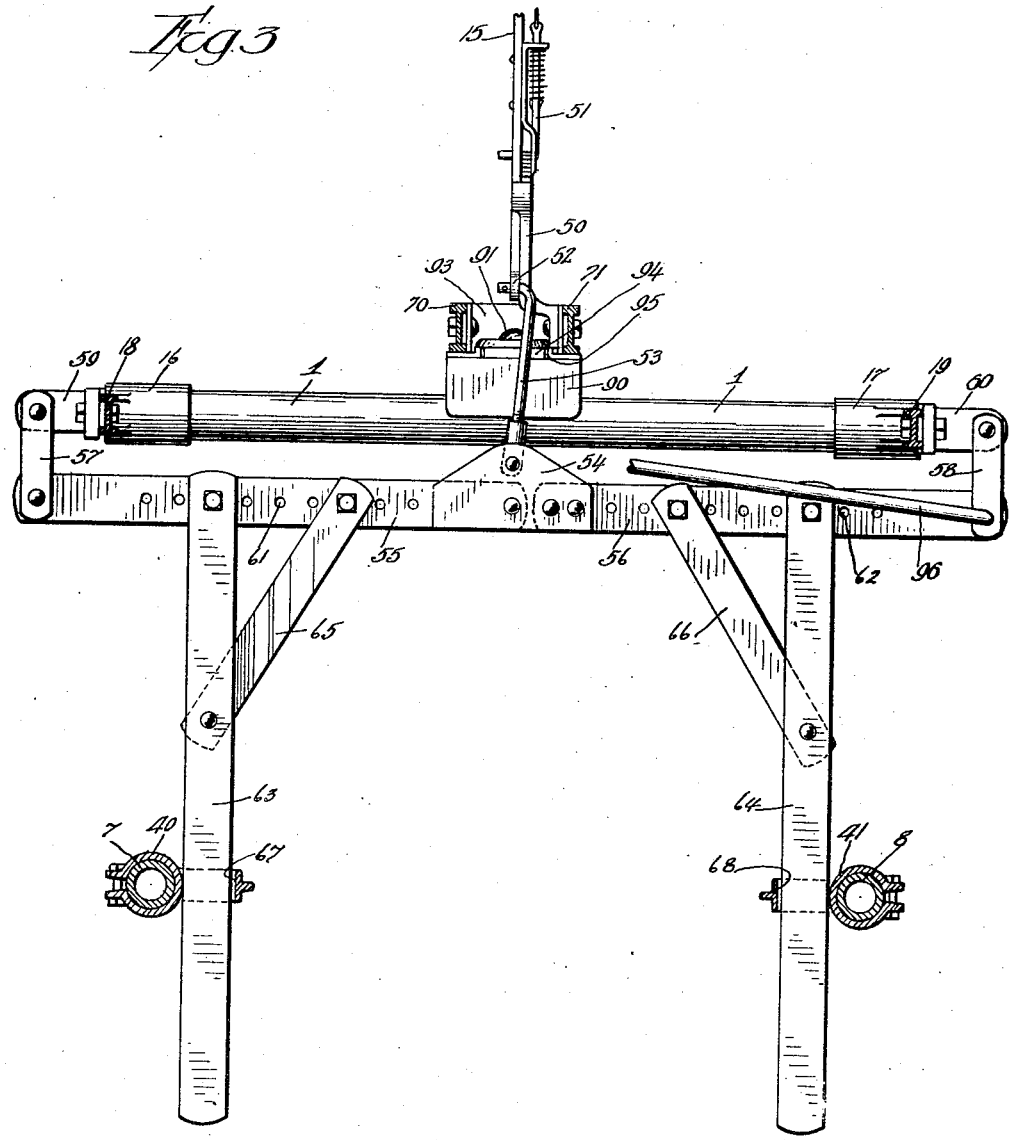

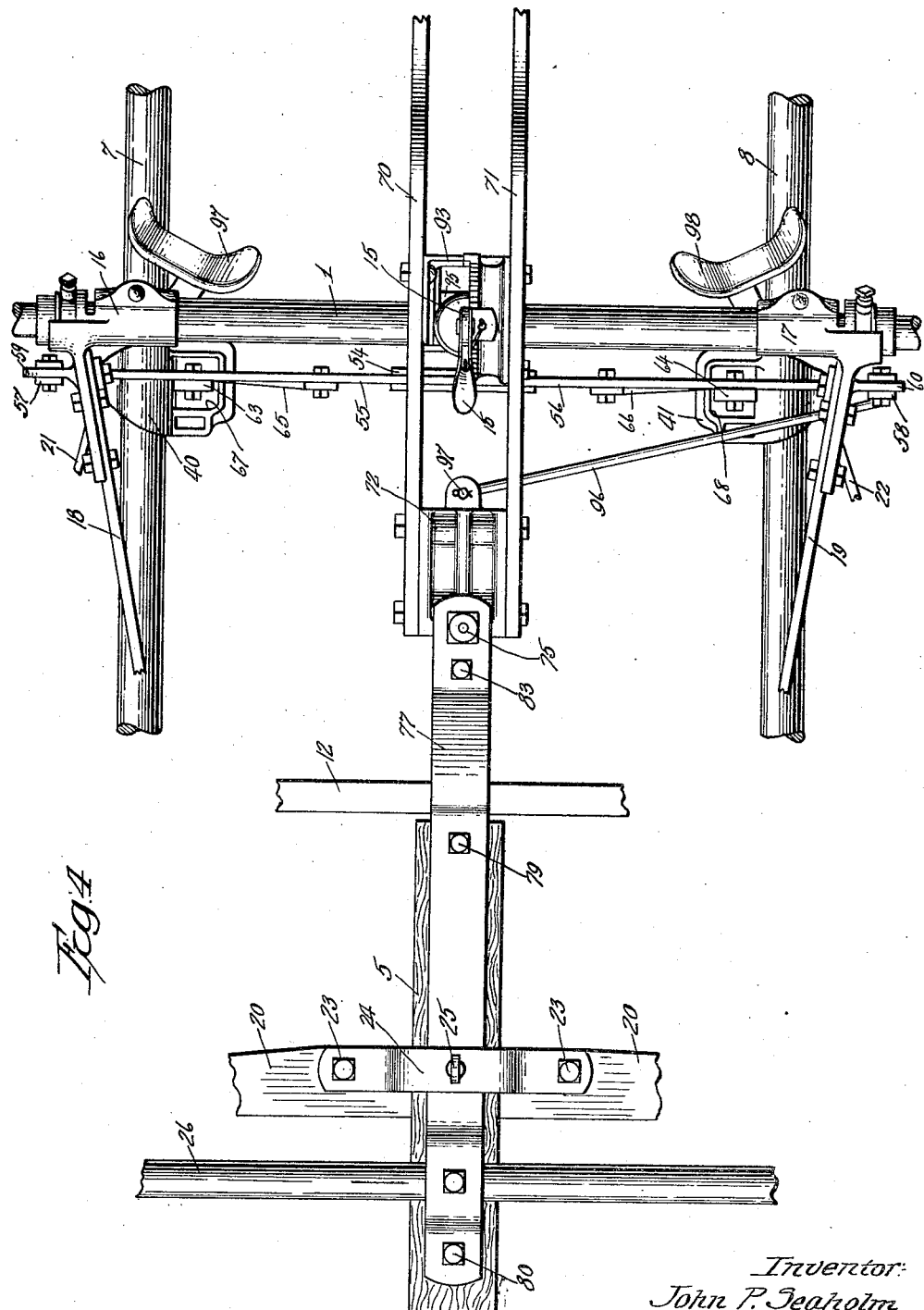

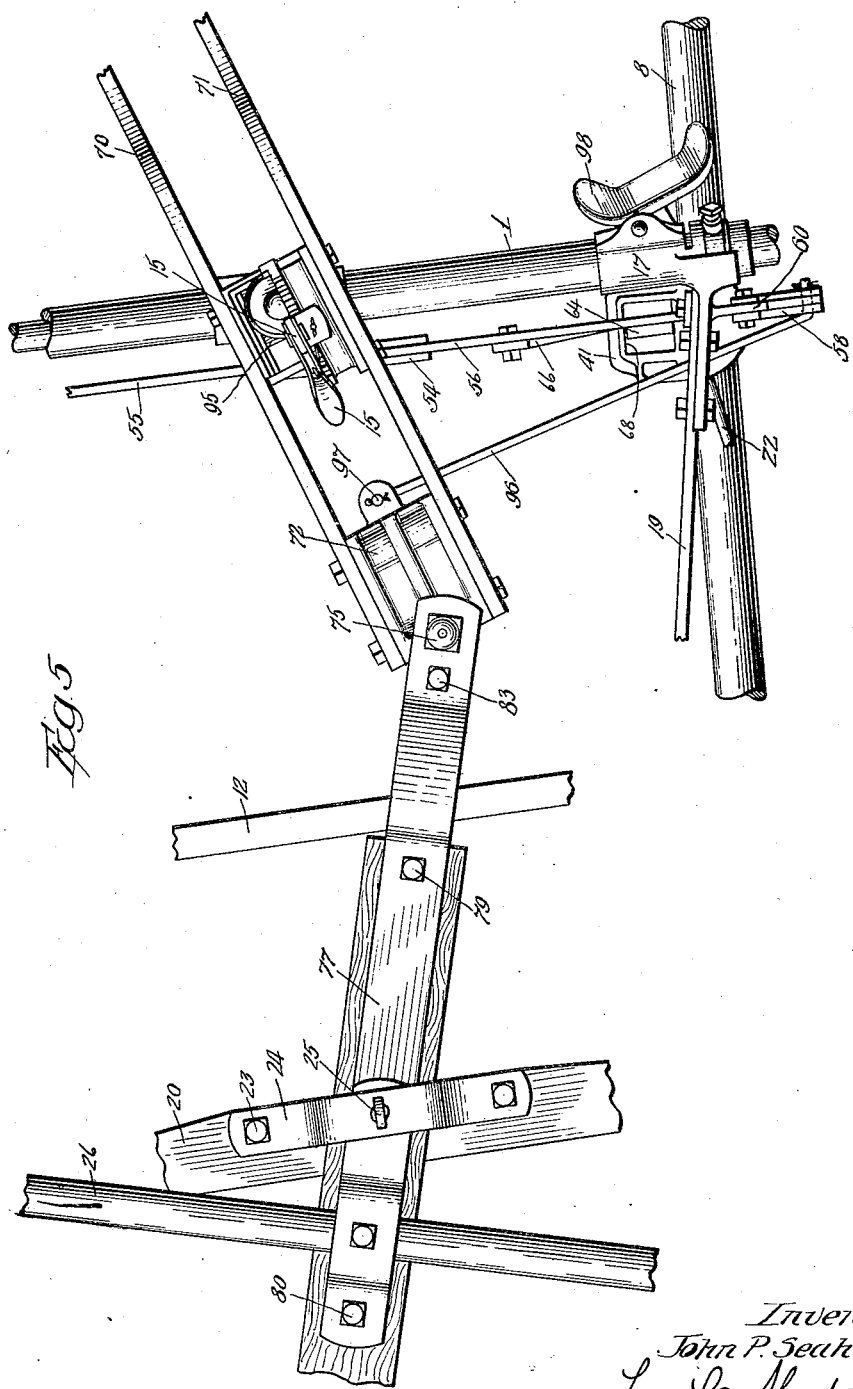

Patented May 10, 1927.

1,628,435

UNITED STATES PATENT OFFICE.

JOHN P. SEAHOLM, OF MOLINE, ILLINOIS, ASSIGNOR, BY MESNE ASSIGNMENTS, TO MOLINE IMPLEMENT COMPANY, A CORPORATION OF ILLINOIS.

SEAT-GUIDE CULTIVATOR.

Application filed May 22, 1924. Serial No. 715,124.

The invention relates to a cultivator.

It relates particularly to a seat-guide cultivator for use in cultivating corn, cotton, and the like.

The general object of the invention is to provide an improved seat-guide cultivator.

A more particular object is to provide a seat-guide cultivator in which movements of the seat move the cultivator drag bars as well as the cultivator supporting wheels.

Other objects and advantages of the invention will appear from the specification and drawings.

An embodiment of the invention is illustrated in the drawings in which

Figure 2 is a side elevation and partial section of the cultivator.

Figure 3 is a front elevation of a portion of the cultivator showing the drag bar spacing means.

Figure 4 is a plan view of a portion of the cultivator showing the parts in the position they occupy when the cultivator is in straight-ahead position.

Figure 5 is a plan view similar to Figure 4 showing the parts in the position they occupy when the seat has been moved to guide the cultivator to the left.

Figure 1:
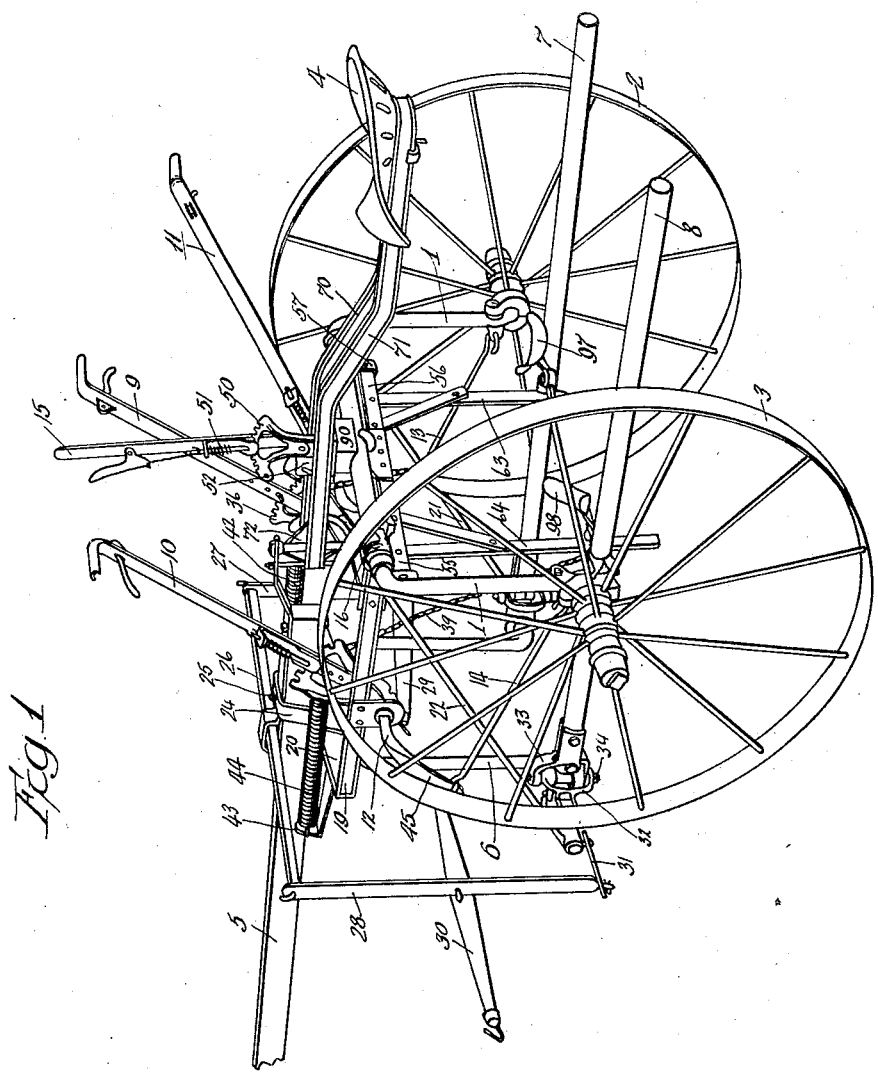
Figure 1 is a perspective view of the cultivator.

The cultivator comprises, in general, an arched axle 1 on which are journalled the supporting or ground wheels 2 and 3. An operator's seat 4 is pivoted on the arched axle and pivotally connected to a guiding pole 5; both pivots being on substantially vertical axes. An arch 6 is supported at the forward end of the cultivator and drag bars 7 and 8 carrying the usual cultivating shovels or other cultivating devices are pivoted to the arch. The drag bars 7 and 8 can be independently raised, lowered, and adjusted by means of the levers 9 and 10. Both drag bars can be raised together by means of a master lever 11 which oscillates a shaft 12 that is connected by the links 13 and 14 to the arched axle 1 so that movements of the master lever not only raise the drag bars but also move the arched axle to balance the cultivator. The distance between the drag bars may be varied by a drag bar spacing means controlled by lever 15.

The arched axle 1 is journalled in the bearings 16 and 17 to which are connected the side members 18 and 19 of the cultivator frame. These side members extend forwardly and are connected to a front cross brace or member 20 of angle cross section. Bracing members 21 and 22 extend from the bearings 16 and 17, respectively, to the arch 6 to brace the arch and the frame together. The arch 6 is held in position on the cross brace 20 by angle bolts 23 which also clamp the U-shaped bracket 24 to the cross brace.

The guiding pole 5 extends through the U-shaped member 24 and is pivoted to it by the bolt 25 which extends through the base of the U, the guiding pole, and the cross brace 20. The guiding pole carries the double-tree 26 with its pendulum members 27 and 28 which carry the swingle trees 29 and 30. The pendulum members are connected to the arch 6 by links, only one of which, 31, is shown.

The drag bars are each connected to the arch 6 in a similar manner and, therefore, only one connection will be described. The connection of the drag bar 7 is illustrated in Figure 2. It comprises a member 32 pivoted to the arch 6 and a second member 33 pivoted to the first on an axis 34. The drag bar 7 is fixed to member 33. This connection permits the drag bar to be moved in both a horizontal and a vertical plane.

The drag bars are raised and lowered independently by means of the levers 9 and 10. Since the connection of each of these levers to its drag bar is the same, only one will be described, namely, that of the drag bar 7 as illustrated in Figure 2. The lever 9 is pivoted at the point 35 and it operates over a toothed sector 36, the lever 9 carrying a latch 37 co-operating with the teeth of the sector. A plate 38 is fixed to the lever 9 and hooked to one side of this plate is a chain 39, the other end of which is connected to the member 40 fixed to the drag bar 7. A similar chain connects a plate on the lever 10 with the member 41 on drag bar 8. Hooked on the other end of the plate 38 is a spring 42, the other end of which is connected to a bracket on the forward end of the cultivator. This bracket is not illustrated but a similar bracket 43 is illustrated in connection with the spring 44 associated with the lever 10. These springs 42 and 44 normally bias the levers 9 and 10 forward and assist in raising the drag bars.

The two drag bars are raised simultaneously by means of the master lever 11 which is fixed to the shaft 12. This shaft carries arms 45 connected to the links 13 and 14 which, in turn, are connected to the bearings for wheels 2 and 3 on the arched axle 1. When the lever 11 is moved, the arched axles are swung in unison with it. Also, when the master lever is moved, the sectors 36 with which the levers 9 and 10 co-operate are moved with the shaft 12. Since the levers 9 and 10 are locked to the sectors they are moved with them and the drag bars are raised by means of the chains 39.

The distance between the drag bars may be varied by means of a spacing mechanism controlled by the lever 15. This lever operates over a sector 50 carried by the seat bar and it has a latch 51 for co-operating with the teeth of the sector. The end of the lever 15 has an angular extension 52 to which is pivoted a link 53. This link is pivoted, in turn, to plates 54. Links 55 and 56 are pivoted on opposite sides of the plates. These links extend outwardly toward the sides of the cultivator and are pivoted to links 57 and 58 which are, in turn, pivoted to the projections 59 and 60 on the bearings 16 and 17. The links 55 and 56 are provided with a series of holes 61 and 62 to receive the connecting bolts of downwardly projecting members 63 and 64. The members 63 and 64 are braced against pivotal movement relative to the links by the braces 65 and 66 and their lower ends extend through openings 67 and 68 in the members 40 and 41 on the drag bars 7 and 8. These openings are sufficiently large to permit the drag bars to move up and down on the members 63 and 64 without interference from the members.

When the drag bars occupy their normal position, the spacing means occupies the position illustrated in Figure 3. When it is desired to move the drag bars closer to or farther from each other, the lever 15 is pulled backward or pushed forward. If it is pulled backward, it pulls the link 53 upwardly which, in turn, pulls the plates 54 upwardly and swings the inner ends of links 55 and 56 upwardly. This swings the lower ends of the members 63 and 64 toward one another and brings the drag bars 7 and 8 closer to one another. When the lever 15 is moved in the opposite direction the opposite action takes place and the drag bars 7 and 8 are moved farther from one another.

The seat 4 is carried by a seat supporting member having two bars 70 and 71 which extend over the arched axle 1 and are bolted to a pivot block 72. This pivot block has two conical pivots 73 and 74 which are received within complementary sockets in the members 75 and 76. The socket members 75 and 76 have squared ends which fit in squared holes in the guiding pole straps 77 and 78. These straps extend forwardly and are bolted on opposite sides of the guiding pole 5 at the points 79 and 80. The two straps 77 and 78 bear on shoulders formed by the flanges 81 and 82 on the socket members 75 and 76 and a bolt 83 connects the two straps. By tightening this bolt, the two socket members 75 and 76 may be drawn into engagement on the conical ends of pivots 73 and 74 to tighten the connection and take up any wear that may occur.

The seat bars are pivoted to swing about a vertical axis on the arched axle 1 and, for this purpose, a bearing block 90 is provided that is bolted to the arched axle 1 by means of a bolt 91 and a complementary clamping member 92 (see Figure 2). The two seat bars 70 and 71 are connected to a U-shaped member 93 which is slidably and rotatably mounted on the bearing block 90. For this purpose the bearing block is provided with a circular projection 94 over which fits a squared washer 95 which, in turn, fits between the arms of the U-shaped member 93. The U-shaped member slides back and forth relative to the washer and the U-shaped member together with the washer turn about the boss or projection 94. In this way, the friction of the sliding motion is taken by the washer thereby relieving the circular projection from the wear due to sliding.

In cultivators of the seat-guide type, it is the usual practice to swing the seat to one side and thereby angle the guiding pole and the cultivator wheels relative to one another. For example, referring to Figures 4 and 5, if the cultivator is to be guided to the left, the seat is swung from the position of Figure 4 to that of Figure 5. This swings the cultivator wheels to the angle shown in Figure 5 and guides the cultivator to the left. The cultivator drag bars move with the cultivator and, when the wheels are first swung around, the tendency is for the rear ends of the drag bars with the shovels connected to them to move in the same direction as the seat, that is, to the right, until the new direction taken by the cultivator carries them back to the left, which is the direction it is desired to guide them. The action of the rear ends of the drag bars in an ordinary seat-guide cultivator is thus just the opposite of what is wanted at the instant the seat is moved. The operator wants to move the shovels to the left to avoid plants, but when he swings the seat to guide the cultivator to the left, the rear ends of the drag bars are momentarily moved to the right, and this may be for just a long enough time to cause the shovels to dig out the plant.

In the cultivator of this application, provision is made for positively swinging the drag bars by means of the seat at the same time that the cultivator is steered. For this purpose, a link 96 is provided which is pivoted at 97 to the pivot block 72 on the forward end of the seat bars, the other end of said link being pivoted to the link 58.

Referring now to Figures 4 and 5, it will be evident that, when the seat bars are swung from the position of Figure 4 to that of Figure 5, the first action of the swinging of the seat bars will move the drag bars 7 and 8 to the left. The link 96 pushes on link 58 and swings the whole linkage mechanism with the drag bars to the left. In this way, the rear ends of the drag bars with the cultivator shovels do not move to the right, when the seat is swung to the right. Instead, they move to the left at the same time the cultivator is being steered to the left with the result that the action of the cultivator in moving them to the right is counteracted. The final result is that the rear ends remain stationary for an instant and then move to the left but without having moved to the right at all. This gives a more instantaneous action than in the ordinary type and avoids the difficulty that would be encountered with the rear ends of the shovels moving to the right when it is really desired to move them to the left.

It will be observed that the spacing means for the drag bar performs three functions, it acts as a spacing means for varying the distance between the drag bars, it serves, in combination with the seat bar, as a means for swinging the drag bars to one side or the other, and it acts to prevent the drag bars from moving laterally relative to the frame while the cultivator is in operation. For example, referring particularly to the last function, when the cultivator is moving forward with the seat bar stationary, the spacing means cannot move to one side or the other because the linkage mechanism is connected to the adjusting lever 15 which is locked to its sector. Also, the linkage mechanism is connected by the link 96 to the seat bars and cannot move unless the seat is moved. The drag bars can, however, be quickly adjusted to and from one another and they can both be moved to the right or left by moving the seat bar, but in any of the positions they are always held against lateral movement.

It should also be noted that the members 40 and 41 on the drag bars serve three purposes. They serve as connections for the chains 39, they serve to receive the members 63 and 64, and they also form supports for the foot rests 97 and 98.

It will be understood that the structure shown is for purposes of illustration only, and that variations may be made without departing from the spirit and scope of the invention.

I claim:

1. A cultivator having a wheeled frame, drag bars pivoted at their forward ends to swing both laterally and vertically on stationary pivots carried by the frame, a seat supporting member pivoted to the cultivator to swing about a substantially vertical axis for steering purposes, and connections between the seat supporting member and the drag bars for positively and quickly swinging the rear ends of the drag bars in unison with and in the same direction as the front portion of the seat supporting member.

2. A cultivator having a wheeled frame including an arched axle, drag bars pivoted at their forward ends to swing both laterally and vertically on stationary pivots carried by the frame, a seat supporting member extending from behind the arched axle to in front of it and pivoted to the cultivator to swing about a substantially vertical axis for steering purposes, and connections between the seat supporting member and the drag bars for positively and quickly swinging the rear ends of the drag bars laterally in unison with the seat supporting member and in the same direction as the portion of the seat supporting member in front of the arched axle.

3. A cultivator having a wheeled frame, drag bars pivoted at their forward ends to swing both laterally and vertically on stationary pivots carried by the frame, a seat supporting member pivoted to the cultivator to swing about a substantially vertical axis for steering purposes, and connections between the seat supporting member and the drag bars for moving the rear ends of the drag bars in unison with the front portion of the seat supporting member, said connections also serving to prevent the drag bars from moving laterally relative to the cultivator when the seat supporting member is stationary.

4. A cultivator having a wheeled frame, drag bars pivoted at their forward ends to swing both laterally and vertically on pivots carried by the frame, a seat supporting member pivoted to the cultivator to swing about a substantially vertical axis for steering purposes, connecting means between the seat supporting member and the drag bars for moving the rear ends of the drag bars laterally in response to movements of the front end of the seat supporting member, said connecting means being connected to the drag bars so as to permit the drag bars to move vertically relative to the connecting means, said connecting means also being adjustable to vary the distance between the drag bars, and means for adjusting the connecting means to vary the distance between the drag bars.

5. A cultivator having a wheeled frame, drag bars mounted on the cultivator to move transversely and vertically, drag bar spacing means connected to the drag bars to permit the latter to move vertically and pivoted to links which in turn are pivoted to the frame, adjusting means for moving the drag bar spacing means on its pivotal connections to the links to vary the distance between the drag bars, a latch device for holding said means in its adjusted positions, and means mounted on the frame and connected to the drag bar spacing means for moving said spacing means and the links on the pivotal connections to the frame to move the drag bars laterally in unison.

6. A cultivator having a wheeled frame, drag bars mounted on the cultivator to move transversely and vertically, drag bar spacing means connected to the drag bars to permit vertical movement of the latter and pivoted to links which in turn are pivoted to said frame, a seat bar pivoted on said frame and connected to said drag bar spacing means to swing the latter on said links to move the drag bars transversely in unison, and adjusting means connected to the drag bar spacing means for moving the same on its pivots to the links to vary the spacing of the drag bars, said adjusting means being mounted in line with the pivot of the seat bar and having a latch for holding it in the positions to which it may be adjusted.

7. A cultivator having a wheeled frame including an arched axle, drag bars pivoted at their forward ends to move both laterally and vertically on pivots carried by the frame, a linkage mechanism carried by the frame forward of the arched axle and connected to the drag bars so as to leave the latter free to move vertically, means for adjusting the linkage mechanism to vary the distance between the drag bars, a seat supporting member pivoted to the cultivator to swing about a substantially vertical axis for steering purposes, and a connection between the front end of the seat supporting member and the linkage mechanism to move the linkage mechanism and the drag bars in unison with and in the same direction as the front portion of the seat supporting member, said linkage mechanism serving to prevent lateral movement of the drag bars when the seat supporting member is stationary.

8. A cultivator having a wheeled frame, drag bars, a pair of links pivoted to the frame at opposite sides and extending downwardly, a second pair of links pivoted to the first pair and extending inwardly, a pivotal connecting device for joining the inner ends of the second pair of links, a lever mechanism for varying the position of the pivotal connecting device, a downwardly extending member carried by one of the second pair of links, said member extending loosely through an opening in a member carried by one of the drag bars and being braced against pivotal movement relative to the link to which it is connected, a downwardly extending member carried by the other of said second pair of links, said second downwardly extending member extending loosely through an opening in a member carried by the other drag bar and being braced against pivotal movement relative to the link to which it is connected, a seat supporting member pivoted to the cultivator to swing about a substantially vertical axis for steering purposes, and a connection between the seat supporting member and the linkage mechanism.

9. A cultivator having a wheeled frame, including an arched axle, drag bars carried by the frame and movable both laterally and vertically, a seat supporting bar pivoted to the cultivator so as to be movable laterally to guide the cultivator, a linkage mechanism pivoted to the frame and including links which extend downwardly and co-operate with connections on the drag bars so that lateral movements of the links will move the drag bars laterally but the drag bars will remain free to move vertically relative to the links, an adjusting device mounted on the arched axle and connected to the linkage mechanism for adjusting said mechanism to vary the distance between the drag bars, and a connection between the seat supporting bar and the linkage mechanism for swinging the linkage mechanism laterally in unison with the seat bar.

In testimony whereof, I affix my signature.

JOHN P. SEAHOLM.